United States Patent [19]

Siwko

[11] 3,952,143

[45] Apr. 20, 1976

[54] WIDE BAND AFC SYSTEM

[75] Inventor: Karol Siwko, Batavia, N.Y.

[73] Assignee: GTE Sylvania Incorporated, Stamford, Conn.

[22] Filed: Mar. 31, 1975

[21] Appl. No.: 563,578

[52] U.S. Cl............................. 178/5.8 AF; 325/420
[51] Int. Cl.²........................................... H04N 5/50
[58] Field of Search................... 178/5.8 AF, 5.8 R; 325/422, 423, 420

[56] References Cited
UNITED STATES PATENTS

| | | | |
|---|---|---|---|
| 3,858,000 | 12/1974 | Merriweather et al........ | 178/5.8 AF |
| 3,867,568 | 2/1975 | Merriweather................ | 178/5.8 AF |
| 3,869,674 | 3/1975 | Borbely........................ | 178/5.8 AF |

*Primary Examiner*—George H. Libman
*Attorney, Agent, or Firm*—Norman J. O'Malley; Robert E. Walrath; Robert T. Orner

[57] ABSTRACT

A wide band automatic frequency control (AFC) system is shown wherein the presence or absence of a video signal in the video channel is detected by determining whether synchronizing pulses are present and modifying the error voltage from the AFC amplifier in the absence of detected synchronizing pulses. Additionally, a voltage combining network comprising three series connected resistors for combining a tuning voltage with the error signal from the error amplifier for application to UHF and/or VHF tuners with varactor diodes is shown.

13 Claims, 6 Drawing Figures

WIDE BAND AFC SYSTEM

CROSS-REFERENCE TO RELATED APPLICATION

Arumugham et al., "Wide Band Automatic Frequency Control Circuit," Ser. No. 554,316, filed Feb. 28, 1975, and assigned to the same assignee as the present invention.

FIELD OF THE INVENTION

This invention relates to wide band automatic frequency control (AFC) systems and more particularly to AFC systems for television receivers in which blocking is prevented and which have the capability of accomodating a wide variety of tuners.

BACKGROUND OF THE INVENTION

Typical AFC systems for television receivers detect the frequency of the intermediate frequency (IF) signal and develop an error signal dependent upon the frequency deviation of the IF video carrier from the desired intermediate frequency. The error signal is applied to the radio frequency (RF) tuner oscillator to correct or adjust the oscillator frequency, and hence, the IF video carrier, toward the desired frequency. If the tuner oscillator frequency falls relatively close to the desired frequency, an appropriately designed narrow band AFC system will normally lock on the IF video carrier. Unfortunately, tuners are mechanically switched devices that operate at high frequencies and assuring that the frequency of the tuner oscillator always falls within predetermined narrow limits is prohibitively expensive and complex particularly when both the UHF and VHF bands are considered. While wide band AFC systems have been used with more or less adequate performance, a persistent problem has been the capability of the AFC system to lock onto the co-channel sound carrier. Prior art systems for preventing locking on the sound carrier have generally involved relatively complex, and hence, unduly expensive circuitry, erratic or unpredictable performance, and other deleterious effects.

RF tuners in common use generally fall into two broad catagories: (1) tuners which use passive components such as coils and/or capacitors as frequency determining elements, and (2) tuners which use voltage controlled capacitances such as varactor diodes as the frequency determining elements. While other varieties or combinations of frequency determining elements can be used, the elements for determining the oscillator frequency generally has been of one of the two types mentioned. The mechanism for correcting the oscillator frequency will necessarily vary depending upon the type of frequency determining elements used. For example, varactor diodes have a non-linear characteristic which results in a change in sensitivity depending upon the frequency, and hence, the applied voltage at which the tuner is operating. Accordingly, the error voltage from the AFC circuit will result in different pull-in and hold-in ranges for different channels. Furthermore, it is often desirable to use the same AFC circuit for receivers with tuners of various types, however, the varying characteristics and responses to correction voltages of the different types of tuners have heretofore required substantially dissimilar AFC circuits. In yet other arrangements, it is desirable to use a UHF tuner with voltage controlled capacitances and a VHF tuner with passive frequency determining elements, or vice versa, in the same receivers while incorporating only one AFC circuit for both tuners.

OBJECTS OF THE INVENTION

It is a primary object of this invention to obviate the above-noted and other disadvantages of the prior art.

It is a further object of this invention to provide a wide band AFC circuit with improved performance.

It is a further object of this invention to provide a wide band AFC circuit which does not lock on undesired carriers.

It is a still further object of this invention to provide a wide band AFC circuit which operates in a predictable manner.

It is a yet further object of this invention to provide an uncomplicated AFC circuit compatible with a wide variety of RF tuners.

It is a still further object of this invention to provide an inexpensive AFC circuit which achieves the above objects.

SUMMARY OF THE INVENTION

The above and other objects and advantages are achieved in one aspect of this invention in an automatic frequency control system for a television receiver having a radio frequency tuner, an intermediate frequency amplifier connected thereto, a video channel connected to the intermediate frequency amplifier, and deflection circuits including a synchronizing pulse separator connected to the video channel. The automatic frequency control system includes an automatic frequency control circuit including a discriminator means connected to an output of the intermediate frequency amplifier and an error amplifier connected to an output of the discriminator means and to an input of the radio frequency tuner, and signal detector circuitry connected to the video channel and to the automatic frequency control circuit. The signal detector circuitry includes first and second transistors and first and second bias means. The first bias means is connected to the first transistor and to the video channel for biasing the first transistor to a first conducting condition in response to a composite video signal in the video channel and to a second conducting condition in response to the absence of a characteristic of the signal in the video channel. The second bias means is connected from the first transistor to the second transistor for biasing the second transistor in a first conducting state when the first transistor is in the first conducting condition and to a second conducting state when the first transistor is in the second conducting condition. A resistor is connected between an output of the second transistor and an output of the error amplifier for modifying the error signal at the output of the error amplifier when the second transistor is in the second conducting state for extending the pull-in range of the automatic frequency control system.

The above and other objects and advantages are achieved in another aspect of this invention in an automatic frequency control system for a television receiver having a radio frequency tuner including a UHF tuner and a VHF tuner, an intermediate frequency amplifier connected to the radio frequency tuner for receiving intermediate frequency signals therefrom, and a video channel connected to the intermediate frequency amplifier. The automatic frequency control system includes an automatic frequency control circuit having an error amplifier for providing an error signal indicative of the frequency error of the signals amplified by the intermediate frequency amplifier, and voltage combining means. The voltage combining means includes a source of tuning voltage and first, second, and third resistors connected in series between the source of tuning voltage and output of the error amplifier. The voltage combining means further includes means connecting the junction of the first and second resistors to the UHF tuner for providing a voltage thereto equal to the tuning voltage for a frequency error of a first sense and proportional to the tuning voltage and the ratio of the resistance of the first resistor to the total resistance of the first, second, and third resistors for a frequency error of a second sense. The voltage combining means further includes means connecting the junction of the second and third transistors to the VHF tuner for providing a voltage thereto equal to the tuning voltage for a frequency error of a first sense and proportional to the tuning voltage and the ratio of the resistance of said first and second resistors to the total resistance of the first, second, and third resistors for a frequency error of a second sense.

The above and other objects and advantages are achieved in another aspect of this invention in an automatic frequency control system for a television receiver having a radio frequency tuner including a UHF tuner and a VHF tuner, an intermediate frequency amplifier connected to the radio frequency tuner for receiving intermediate frequency signals therefrom, and a video channel connected to the intermediate frequency amplifier. The automatic frequency control system includes an automatic frequency control circuit having an error amplifier for providing an error signal indicative of the frequency error of signals amplified by the intermediate frequency amplifier, and a network coupling the error amplifier to the radio frequency tuner. The network includes first and second circuits and switching means connected to the error amplifier and to the first and second circuits for discretionarily connecting an output of the error amplifier to the first and second circuits. The first circuit includes a bias means for providing a bias to the error amplifier and is connected to one of the UHF and VHF tuners. The second circuit includes a source of tuning voltage, first and second resistance means connected in series with the source of tuning voltage, and means connecting the junction of the first and second resistance means to the other of the UHF and VHF tuners for providing a voltage thereto equal to the tuning voltage for a frequency error of a first sense and proportional to the tuning voltage and the ratio of the resistance of the first resistance means to the total resistance of the first and second resistance means for a frequency error of a second sense.

DETAILED DESCRIPTION OF THE PREFERRED EMBODIMENTS

For a better understanding of the present invention, together with other and further objects, advantages and capabilities thereof, reference is made to the following disclosure in conjunction with the accompanying drawings.

Figure 1:
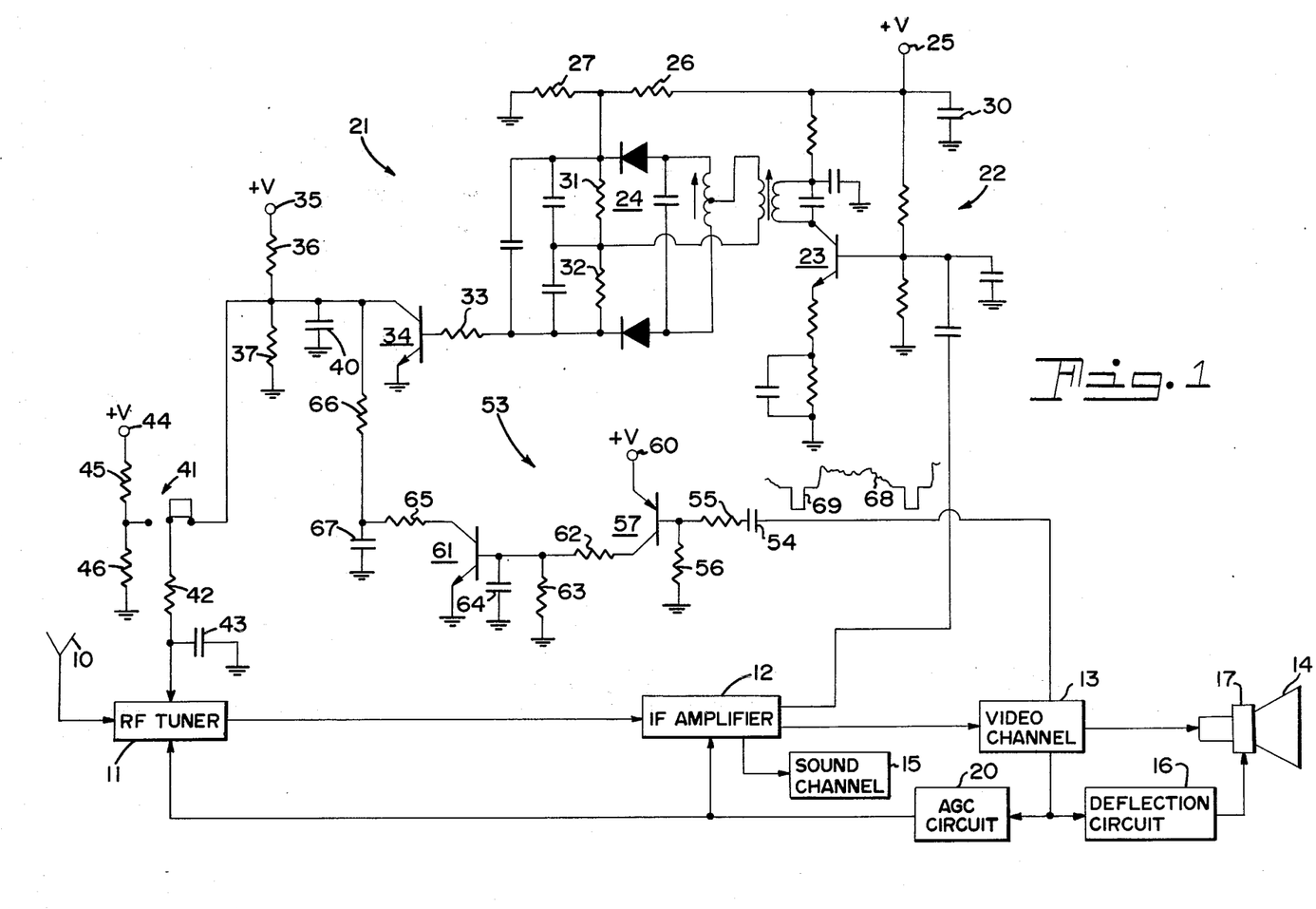
FIG. 1 is a block and schematic diagram of a television receiver incorporating one embodiment of the invention.

In the embodiment of FIG. 1 typical television receiver components are shown in block diagram form. A signal receiving means illustrated as an antenna 10 couples received signals to a radio frequency (RF) tuner 11 which heterodynes the received signals to an intermediate frequency (IF). The IF signal is amplified by an IF amplifier 12. An output of IF amplifier 12 is connected to a video channel or circuit 13 which detects the IF signal to provide a composite video signal. The composite video signal is amplified within circuit 13 and applied to an image display device illustrated as a cathode ray tube (CRT) 14. At least the sound portion of the IF signal is coupled from IF amplifier 12 to a sound channel 15 which detects, amplifies, and reproduces the sound portion of the received signal. The composite video signal in circuit 13 is also coupled to deflection circuits 16 which generate deflection signals for application to deflection windings in a deflection yoke 17 associated with CRT 14. Deflection circuits 16 include a synchronizing pulse separator which separates the synchronizing pulses from the composite video signal to synchronize the deflection signals with the composite video signal. An automatic gain control (AGC) circuit 20 provides gain control voltages to RF tuner 11 and IF amplifier 12 in response to the strength of the composite video signal in circuit 13. In the case of a color television receiver, video circuit 13 includes chrominance signal processing circuitry as well as luminance signal processing circuitry.

Typically, RF tuner 11 includes an oscillator which is controlled by channel selection circuitry and devices to provide a heterodyning frequency to heterodyne the desired channel to the intermediate frequency. IF amplifier 12 has a frequency response similar to that shown in FIG. 2. In typical practice the IF video carrier has an intermediate frequency $f_v$ of 47.75 mHz while the IF sound carrier $f_s$ is at 41.25 mHz, however, the invention is not limited to just these two frequencies. If, for some reason, the frequency of the oscillator in RF tuner 17 is incorrect, the IF carriers will not be at the precise frequencies desired. The frequency of the oscillator in RF tuner 11 may be incorrect for any one of a number of reasons such as incorrect fine tuning, component drift, or the like. The effect of such frequency error is that the tuned circuits in IF amplifier 12 do not function properly. For example, the video and sound carriers will be amplified at incorrect levels and, in the case of a color television receiver, the chrominance sub-carrier will also be amplified incorrectly thereby resulting in incorrect sound, luminance, and chrominance information which will deleteriously affect reproduction of the picture and sound information. Extraneous signals such as adjacent channel carriers may also be insufficiently attenuated thereby causing interference. An automatic frequency control (AFC) system 21 compensates for such frequency errors by correcting the frequency of the oscillator in RF tuner 11 in response to the IF frequency deviation at an output of IF amplifier 12.

In AFC system 21, an output of IF amplifier 12 is connected to an input of an AFC circuit 22 including a discriminator means and an error amplifier. The discriminator means includes an AFC IF amplifier 23 having an input connected to the output of IF amplifier 12 and a frequency discriminator 24 connected in circuit therewith to form a Foster-Seeley discriminator. A source of energizing voltage illustrated as a terminal 25, which provides bias voltages for amplifier 23, is connected by resistors 26 and 27 in series to a common conductor illustrated as circuit ground. A filter capacitor 30 is connected in parallel with resistors 26 and 27. The junction between resistors 26 and 27 is connected via output resistors 31 and 32 of discriminator 24 to the error amplifier. The error amplifier includes a resistor 33 connected from the output of discriminator 24 to an input electrode illustrated as a base of a transistor 34 which has a common electrode illustrated as an emitter connected to circuit ground and an output electrode illustrated as a collector. The AFC circuit described thus far is similar to that disclosed in Kruszewski U.S. Pat. No. 3,814,843 and reference can be made thereto for additional structural and operational details of AFC circuit 22.

A source of energizing potential illustrated as a terminal 35 is connected by resistors 36 and 37 in series to circuit ground with the junction therebetween connected to the collector of transistor 34. The collector of transistor 34 is further connected by a filter capacitor 40 to circuit ground and to one terminal of a switch 41 which has a second terminal connected by a resistor 42 to an input of RF tuner 11 which is also connected by a filter capacitor 43 to circuit ground. A source of energizing potential illustrated as a terminal 44 is connected by resistors 45 and 46 in series to circuit ground with a junction therebetween connected to a third terminal of switch 41.

During set-up when the channel selection means of RF tuner 11 is being fine tuned, switch 41 connects the junction of resistors 45 and 46 to the AFC input of RF tuner 11 so that a predetermined bias is applied thereto without alteration by any AFC error voltage. During normal operation switch 41 connects the collector of transistor 34 to the AFC input of RF tuner 11 so that the AFC system holds the frequency of the IF video carrier at substantially the desired IF frequency.

Figures 3A, 3B, 4:
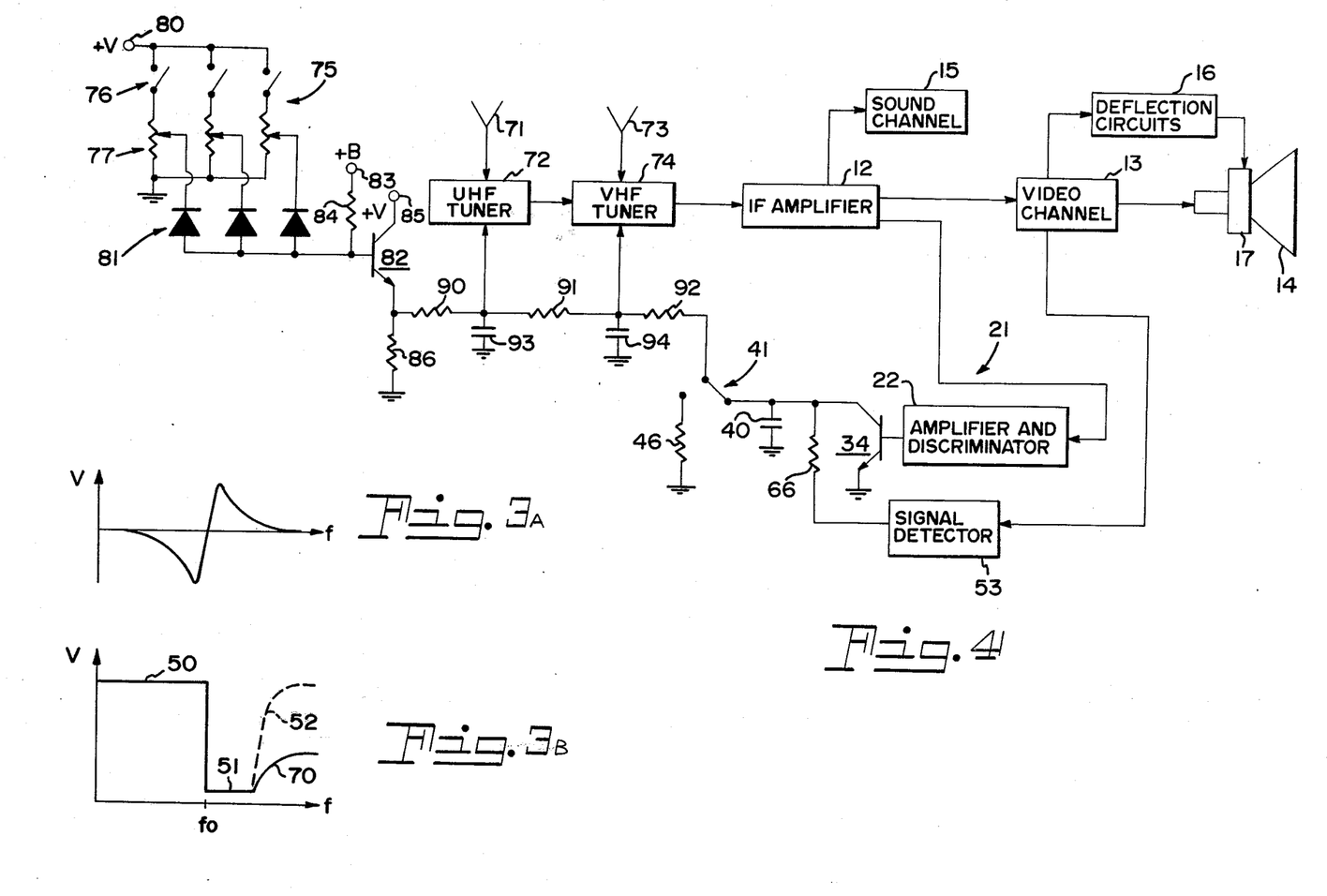
FIGS. 3A and 3B are graphs illustrating the frequency response of an AFC system in accordance with the invention.
FIG. 4 is a block and schematic diagram of another embodiment of the invention.

FIG. 3A is a graph of a typical S-curve such as that provided by discriminator 24. The voltage from discriminator 24 "rides on" a bias level determined by source 25 and resistors 26 and 27. In the preferred embodiment transistor 34 is non-conducting or cut-off at the quiescent bias level. For example, the quiescent bias level at the base of transistor 34 can be 0.5 volts. When the frequency of the oscillator in RF tuner 11 is in error in a first sense such as too high, discriminator 24 provides an error voltage at the base of transistor 34 which is positive with respect to the quiescent bias level to cause transistor 34 to become conductive. Transistor 34 is preferably a high gain transistor which rapidly goes into saturation. At some predetermined higher frequency of the oscillator in RF tuner 11, discriminator 24 will provide insufficient output voltage to hold transistor 34 saturated and the collector voltage of transistor 34 will rise.

For frequency errors of a second sense or below the desired center frequency $f_o$ the error voltage from discriminator 24 will be negative with respect to the quiescent bias level and transistor 34 will be cut-off. The collector voltage of transistor 34 is illustrated in FIG. 3B wherein the level 50 represents a non-conducting or cut-off condition and level 51 represents a saturated condition. When transistor 34 is cut-off, the frequency of the oscillator in RF tuner 11 is corrected in a direction to increase the IF video carrier frequency. When transistor 34 is saturated, the frequency of the oscillator in RF tuner 11 is corrected so that the IF video carrier frequency decreases. In the vicinity of the center frequency $f_o$ the transition between saturation and cut-off is preferably relatively abrupt to define the frequency tolerance of AFC system within narrow limits.

As was noted above, when the frequency deviation from $f_o$ is sufficiently large, the error voltage from discriminator 24 will be insufficient to hold transistor 34 saturated. Accordingly, the conduction of transistor 34 will decrease to cut-off as is illustrated by dashed curve 52 in FIG. 3B. Accordingly, transistor 34 will be biased for conduction in saturation in response to error frequencies within a predetermined range represented by line 51 of FIG. 3B and for cut-off for error frequencies out of the range. Since the frequency of the oscillator in RF tuner 11 increases when transistor 34 is cut-off, dashed curve 52 defines the upper limit of the pull-in range of the AFC system because the system will push away instead of pull-in. The portion of the frequency response indicated by dashed curve 52 is unavoidable since AFC circuit 22 is driven by IF amplifier 12 and, when the frequency of the IF video carrier is in the range indicated by dashed line 52, it is heavily attenuated by the IF filters in IF amplifier 12.

Figures 2, 5:
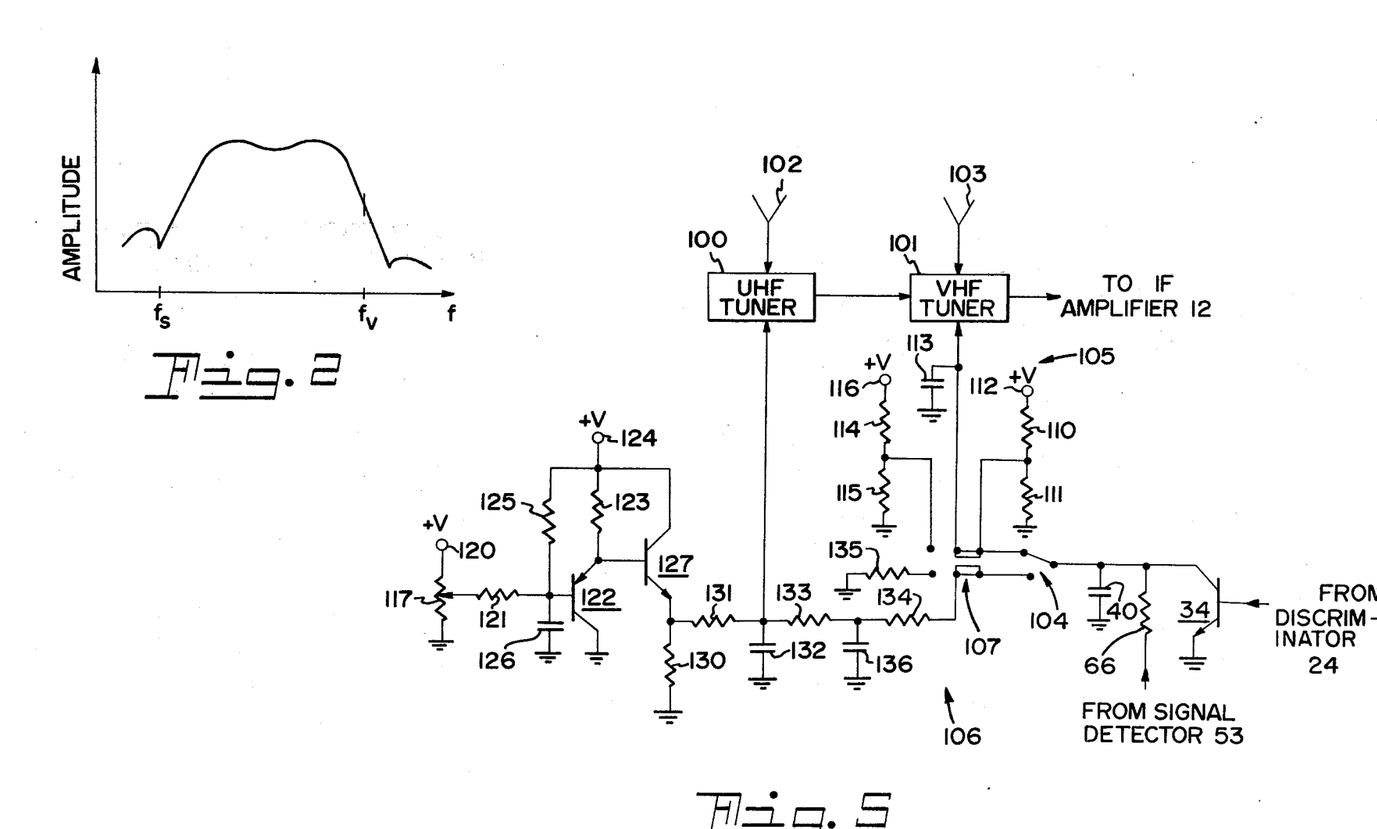
FIG. 2 is a graph of a typical frequency response characteristic of a television receiver intermediate frequency amplifier.
FIG. 5 is a block and schematic diagram of another embodiment of the invention.

Referring to FIG. 2, it is seen that when the IF video carrier frequency increases such that AFC system 21 is operating on dashed curve 52 of FIG. 3B, the video carrier will be amplified less while the sound carrier will be amplified more. AGC circuit 20 will further increase the amplification of the sound carrier by increasing the gain of RF tuner 11 and IF amplifier 12. Accordingly, it is readily seen that the AFC system will lock onto the sound carrier and block or lock out the video carrier. Such action can occur when the fine tuning of a channel is sufficiently incorrect, during momentary power interruptions, when channels are changed, and due to other similar phenomena. To overcome this blocking or lockout effect signal detector circuitry 53 is provided.

An output of video circuit 13 is connected by a bias means illustrated as a capacitor 54, resistor 55, and resistor 56 connected in series between the output of video circuit 13 and circuit ground. The junction between resistors 55 and 56 is connected to an input electrode illustrated as a base of a transistor 57 which has a common electrode illustrated as an emitter connected to a source of energizing potential illustrated as a terminal 60. An output electrode illustrated as a collector of transistor 57 is connected by a bias means to an input electrode illustrated as a base of a transistor 61. The bias means connected from transistor 57 to transistor 61 includes a resistor 62 connected between the collector of transistor 57 and the base of transistor 61, a resistor 63 connected from the base of transistor 61 to circuit ground, and a capacitor 64 connected from the base of transistor 61 to circuit ground. A common electrode illustrated as an emitter of transistor 61 is connected to circuit ground and an output electrode illustrated as a collector is connected by series connected resistors 65 and 66 to the collector of transistor 34. A filter capacitor 67 is connected from the junction of resistors 65 and 66 to circuit ground.

A composite video signal 68 including synchronizing pulses 69 is connected via capacitor 54 and resistor 55 to the base of transistor 57. The composite video signal causes a bias to develop across capacitor 54 which biases transistor 57 in cut-off. During each line of the video information, however, some charge leaks from capacitor 54 so that transistor 57 conducts during each synchronizing pulse. The current pulses at the collector of transistor 57 due to conduction during synchronizing pulses do not cause sufficient bias to develop across capacitor 64 to bias transistor 61 on. Accordingly, transistor 61 remains cut-off and does not affect the error signal from AFC circuit 22. The described operation defines a first conducting condition of transistor 57 and a first conducting state of transistor 61.

If the AFC system starts to push away or locks onto the sound carrier, the signal in video circuit 13 will not be a proper composite video signal. Signal detector circuitry 53 detects the lack of a proper composite video signal by detecting the absence of a characteristic in the signal, such as synchronizing pulses, which normally should be present. When the synchronizing pulses decrease to a sufficiently low level or disappear altogether, transistor 57 is biased to a second conducting condition wherein it conducts for a greater period of time than the synchronizing pulse intervals. This greater conduction period of transistor 57 causes a voltage to develop across capacitor 64 to bias transistor 61 in a second conducting state or saturation. When transistor 61 is on, the error voltage at the collector of transistor 34 is modified as is shown by line 70 of FIG. 3B. The voltage at the collector of transistor 34 is then sufficiently low to cause the oscillator in RF tuner 11 to decrease in frequency toward $f_o$ thereby extending the pull-in range of the AFC system.

The embodiment of FIG. 4 illustrates the application of the invention to tuners with voltage dependent capacitors as the tuning elements. In FIG. 4, the RF tuner is illustrated as including UHF and VHF tuners. A UHF antenna 71 is connected to a UHF tuner 72 and a VHF antenna 73 is connected to a VHF tuner 74 and the output of tuners 72 and 74 is connected to IF amplifier 12. In the illustrated embodiment the output of UHF tuner 72 is connected via VHF tuner 74 to IF amplifier 12. In the embodiment of FIG. 4 components the same as those in FIG. 1 are numbered the same.

Band switching circuitry 75 includes a plurality of switches 76 each connected in series with the resistive element of a respective potentiometer 77 between a source of energizing potential illustrated as a terminal 80 and circuit ground. The taps of potentiometers 77 are connected to cathodes of respective diodes 81 the anodes of which are connected to an input electrode illustrated as a base of a transistor 82. While simplified band switching circuitry 75 is illustrated, in practice band switching circuitry in accordance with that disclosed in Rhee U.S. Pat. No. 3,859,610 was used. Alternative band switching circuitry is disclosed in LeFevre U.S. Pat. Nos. 3,787,788 and 3,790,909.

A source of energizing potential illustrated as a terminal 83 is connected by a resistor 84 to the base of transistor 82. A source of energizing potential illustrated as a terminal 85 is connected to a collector of transistor 82 while an output electrode illustrated as an emitter thereof is connected by a resistor 86 to circuit ground. Band switching circuitry 75 and transistor 82 comprise a source of tuning voltage. First, second, and third resistors 90, 91, and 92 are connected in series from the emitter of transistor 82 to the collector of transistor 34. The collector bias circuit of transistor 34 is altered from that shown in FIG. 1 by removing components 35–37 so that the collector of transistor 34 receives its bias from the emitter of transistor 82. The junction between resistors 90 and 91 is connected to a tuning voltage input of UHF tuner 72 and by a filter capacitor 93 to circuit ground. The junction between resistors 91 and 92 is connected to a tuning voltage input of VHF tuner 74 and by a filter capacitor 94 to circuit ground. The set-up bias circuit connected to the third terminal of AFC switch 41 is altered by removing components 44 and 45. Other than the changes indicated above, the circuit of FIG. 4 can be the same as that described in connection with FIG. 1.

Switches 76 of band switching circuitry 75 are part of the channel selection circuitry. Each of potentiometers 77 is adjusted for particular band of frequencies such as low-band VHF, high-band VHF, and UHF. When a channel within a band is selected, the corresponding one of switches 76 is closed to provide a tuning voltage at the emitter of transistor 82.

If transistor 34 is non-conducting, the tuning voltage applied to the input of tuners 72 and 74 is substantially equal to the voltage at the emitter of transistor 82. When transistor 34 is conducting in saturation, the tuning voltage applied to UHF tuner 72 is reduced by the volt drop across resistor 90 and the tuning voltage applied to VHF tuner 74 is reduced by the volt drop across resistors 90 and 91. When transistor 34 is non-conducting, the tuning voltages applied to tuners 72 and 74 are of sufficient magnitude to cause the oscillators therein (which are controlled by the capacitances of voltage dependent capacitors) to increase thereby increasing the IF video carrier frequency. Similarly, when transistor 34 is conducting in saturation, the tuning voltages cause the oscillator frequencies to decrease.

The AFC voltage range for UHF tuner 72 is given by the equation UHF AFC voltage range = $V_T R_{90}/(R_{90} + R_{91} + R_{92})$ where $V_T$ is the tuning voltage at the emitter of transistor 82. Thus, the voltage at the tuning voltage input of UHF tuner 72 is equal to $V_T$ when transistor 34 is cut-off and proportional to $V_T$ and the ratio of the resistance of resistor 90 to the total resistance of resistors 90, 91 and 92 when transistor 34 is saturated. The AFC voltage range for VHF tuner 74 is given by the equation VHF AFC tuning range = $V_T(R_{90} + R_{91})/(R_{90} + R_{91} + R_{92})$. Thus, the voltage at the tuning voltage input of VHF tuner 74 is equal to $V_T$ when transistor 34 is cut-off and proportional to $V_T$ and the ratio of the resistance of resistors 90 and 91 to the total resistance of resistors 90, 91, and 92 when transistor 34 is saturated. The AFC voltage ranges for tuners 72 and 74 define the AFC pull-in range. The voltage combining means comprising resistors 90, 91, and 92 compensate for the varying efficiencies between the voltage dependent capacitors used in UHF tuner 72 and VHF tuner 74 since voltage dependent capacitors typically have a non-linear characteristic and different efficiencies at different frequencies or capacitances.

The operation of signal detector circuitry 53 of the embodiment of FIG. 4 is similar to that described in connection with the embodiment of FIG. 1.

FIG. 5 illustrates the application of the invention to tuners wherein one of the tuners uses passive frequency determining components while the other tuner uses voltage control capacitances as the frequency determining elements. In the specific embodiment illustrated the UHF tuner includes the voltage dependent capacitances while the VHF tuner utilizes passive components, however, those skilled in the art will realize that the invention is equally applicable to radio frequency tuners wherein the VHF tuner includes the voltage dependent capacitances and the UHF tuner utilizes passive components.

In the embodiment of FIG. 5 components numbered from 12 through 34 and from 53 through 67 can be the same as those shown in FIG. 1. Accordingly, the indicated components are not duplicated in FIG. 5 with the exception of error amplifier 34 and resistor 66. Capacitor 40 of FIGS. 1 and 4 is also illustrated in FIG. 5. The collector of transistor 34 is coupled by a network to UHF tuner 100 and VHF tuner 101 which together comprise a radio frequency tuner. UHF tuner 100 has associated therewith an antenna 102 and VHF tuner 101 has associated therewith an antenna 103. The network includes a switching means illustrated as a single-pole, double-throw switch 104, with a common terminal connected to the collector of transistor 34 and second and third terminals connected respectively to a first circuit 105 and a second circuit 106. The first circuit 105 includes one-half of a double-pole, double-throw switch 107. Switch 107 has an input terminal connected to one of the output terminals of switch 104 which terminals are also connected to a bias means. The bias means includes resistors 110 and 111 which are connected in series between a source of energizing potential illustrated as a terminal 112 and circuit ground with the junction between resistors 110 and 111 connected to the input terminal of switch 107. The output terminal of the portion of switch 107 included in circuit 105 is connected to an input of VHF tuner 101. The input of VHF tuner 101 is also connected to circuit ground by a filter capacitor 113. Circuit 105 further includes resistors 114 and 115 connected in series between a source of energizing potential illustrated as a terminal 116 and circuit ground with a junction therebetween being connected to a third terminal of switch 107.

With switches 104 and 107 in the positions illustrated, it is readily seen that circuit 105 is the same as the network coupling the collector of transistor 34 to the input of RF tuner 11 of FIG. 1. Specifically, resistors 110 and 111 together with source 112 correspond to source 35 and resistors 36 and 37 of FIG. 1. The portion of switch 107 included in circuit 105 corresponds to switch 41 and resistors 114 and 115 and source 116 corresponds to source 44 and resistors 45 and 46 of FIG. 1. Accordingly, with switch 104 in the position indicated, the output of error amplifier 34 is connected to VHF tuner 101 to provide an AFC signal thereto in a manner similar to that shown in FIG. 1.

Circuit 106 of FIG. 5 is similar to the voltage combining means of FIG. 4. A potentiometer 117 has a resistance element connected between a source of energizing potential illustrated as terminal 120 and circuit ground and a tap connected by a resistor 121 to an input electrode illustrated as a base of a transistor 122. Transistor 122 has a common electrode illustrated as a collector connected to circuit ground and an output electrode illustrated as an emitter connected by a resistor 123 to a source of energizing potential illustrated as a terminal 124. Source 124 is further connected by a resistor 125 to the base of transistor 122 which is further connected by a filter capacitor 126 to circuit ground. The emitter of transistor 122 is connected to an input electrode illustrated as a base of a transistor 127 which has a common electrode illustrated as a collector connected to source 124 and an output electrode illustrated as an emitter connected by a resistor 130 to circuit ground. Potentiometer 117 and transistors 122 and 127 perform the same functions as band switching circuitry 75 and transistor 82 of FIG. 4, that is, they comprise a source of tuning voltage and provide a tuning voltage at the emitter transistor 127.

The emitter of transistor 127 is connected by a first resistance means illustrated as a resistor 131 to an input of UHF tuner 100 which is further connected to ground by a filter capacitor 132 and by a second resistance means illustrated as series connected resistors 133 and 134 to the output terminal of the second portion of switch 107. The input terminal of the second portion of switch 107 is connected to the second output terminal of switch 104. The second portion of switch 107 further includes a third terminal connected by a resistor 135 to circuit ground. In the illustrated embodiment the junction of resistors 133 and 134 is connected to circuit ground by a filter capacitor 136. Those skilled in the art will realize that resistors 133 and 134 can be replaced by a single resistor. Resistors 131, 133, and 134 of FIG. 5 correspond to resistors 90, 91, and 92 of FIG. 4 while the second portion of switch 107 corresponds to switch 41 of FIG. 4 and resistor 135 corresponds to resistor 46.

When switch 104 is switched to its alternate position connecting the collector of transistor 34 to circuit 106, circuit 106 provides a voltage to UHF tuner 100 equal to the tuning voltage at the emitter of transistor 127 for a frequency error of a first sense and proportional to the tuning voltage and the ratio of the resistance of resistor 131 to the total resistance of resistors 131, 133, and 134 for a frequency error of a second in a manner similar to that described in connection with FIG. 4. Accordingly, the frequency correcting voltage applied to UHF tuner 100 is variable and proportional to the tuning voltage thereby providing an AFC range for UHF tuner 100 similar to that provided for VHF tuner 101 by coupling circuit 105.

Preferably switch 104 is ganged with the channel selection mechanism so that it is switched to the proper position automatically when UHF and VHF channels are selected. Switch 107 provides set-up biases for UHF tuner 100 and VHF tuner 101 when it is switched to its alternative position similar to the operation of switch 41 of FIGS. 1 and 4.

Accordingly, simple and inexpensive signal detector circuitry which operates in a predictable manner has been shown and described. Voltage combining circuitry for combining tuning and AFC voltages for tuners using voltage dependent capacitors as tuning elements has also been shown and described. Signal combining circuitry in accordance with the invention provides an AFC system for tuners using voltage dependent capacitors and/or passive frequency determining elements in various combinations with similar pull-in ranges for UHF and VHF tuning.

While there has been shown and described what is at present considered the preferred embodiments of the invention it will be obvious to those skilled in the art that various changes and modifications may be made therein without departing from the invention as defined by the appended claims.

What is claimed is:

1. In a television receiver having a radio frequency tuner; an intermediate frequency amplifier connected thereto; a video channel connected to said intermediate frequency amplifier; and deflection circuits including a synchronizing pulse separator connected to said video channel; an automatic frequency control system including an automatic frequency control circuit including a discriminator means connected to an output of said intermediate frequency amplifier and an error amplifier connected to an output of said discriminator means and to an input of said radio frequency tuner wherein the improvement comprises signal detector circuitry connected to said video channel and to said automatic frequency control circuit comprising:

a first transistor;

first bias means connected to said first transistor and to said video channel for biasing said first transistor to a current conducting condition in response to signals in said video channel and including a series connected capacitor and resistor with a junction therebetween connected to the base of said first transistor for biasing said first transistor to a cut-off condition in response to conduction by said first transistor during synchronizing pulses contained in a composite video signal in said video channel;

a second transistor;

second bias means connected from said first transistor to said second transistor for biasing said second transistor in a first conducting state when said first transistor is in said cut-off condition and to a second conducting state when said first transistor is in said current conducting condition; and a resistor connected between an output of said second transistor and an output of said error amplifier for modifying the error signal at the output of said error amplifier when said second transistor is in said second conducting state for extending the pull-in range of the automatic frequency control system.

2. An automatic frequency control system as defined in claim 1 wherein said first conducting state of said second transistor is cut-off and said second conducting state is saturation.

3. An automatic frequency control system as defined in claim 1 wherein said error amplifier includes a third transistor having a collector connected by a coupling network to said tuner and a base connected to the output of said discriminator means and biased for conduction in saturation in response to error frequencies within a predetermined range and for cut-off for error frequencies out of said range, the error signal being modified by said second transistor when said error frequencies are greater than a predetermined magnitude.

4. In a television receiver having a radio frequency tuner including a UHF tuner and a VHF tuner; an intermediate frequency amplifier connected to said radio frequency tuner for receiving intermediate frequency signals therefrom; and a video channel connected to said intermediate frequency amplifier; an automatic frequency control system including an automatic frequency control circuit having an error amplifier for providing an error signal indicative of the frequency error of signals amplified by said intermediate frequency amplifier wherein the improvement comprises voltage combining means comprising:

a source of tuning voltage;

first, second, and third resistors connected in series between said source of tuning voltage and the output of said error amplifier;

means connecting the junction of said first and second resistors to said UHF tuner for providing a voltage thereto equal to said tuning voltage for a frequency error of a first sense and proportional to said tuning voltage and the ratio of the resistance of said first resistor to the total resistance of said first, second, and third resistors for a frequency error of a second sense; and means connecting the junction of said second and third resistors to said VHF tuner for providing a voltage thereto equal to said tuning voltage for a frequency error of a first sense and proportional to said tuning voltage and the ratio of the resistance of said first and second resistors to the total resistance of said first, second, and third resistors for a frequency error of a second sense.

5. An automatic frequency control system as defined in claim 4 wherein said error amplifier is a transistor having a collector electrode connected to said third resistor, said transistor being cut-off for frequency errors of said first sense and saturated for frequency errors of said second sense.

6. An automatic frequency control system as defined in claim 4 wherein said source of tuning voltage includes band switching circuitry for providing a plurality of set-up voltages for respective bands of television channels and means for connecting said band switching circuitry to said first resistor.

7. An automatic frequency control system as defined in claim 4 further including signal detector circuitry connected to said video channel and to said error amplifier for detecting a video signal in said video channel and modifying the voltage provided to said UHF and VHF tuners in the absence of a detected video signal.

8. An automatic frequency control system as defined in claim 7 wherein said signal detector circuitry includes a transistor having an output electrode connected by a fourth resistor to said third resistor, said transistor being switched to a conducting state in the absence of a detected video signal to decrease the voltage provided to said UHF and VHF tuners.

9. In a television receiver having a radio frequency tuner including a UHF tuner and a VHF tuner; an intermediate frequency amplifier connected to said radio frequency tuner for receiving intermediate frequency signals therefrom; and a video channel connected to said intermediate frequency amplifier; an automatic frequency control system including an automatic frequency control circuit having an error amplifier for providing an error signal indicative of the frequency error of signals amplified by said intermediate frequency amplifier wherein the improvement comprises a network coupling said error amplifier to said radio frequency tuner comprising:

a first circuit, including a bias means for providing a bias to said error amplifier, connected to one of said UHF and VHF tuners;

a second circuit including a source of tuning voltage, first and second resistance means connected in series with said source of tuning voltage, and means connecting the junction of said first and second resistance means to the other of said UHF and VHF tuners for providing a voltage thereto equal to said tuning voltage for a frequency error of a first sense and proportional to said tuning voltage and the ratio of the resistance of said first resistance means to the total resistance of said first and second resistance means for a frequency error of a second sense; and switching means connected to said error amplifier and to said first and second circuits for discretionarily connecting an output of said error amplifier to said first and second circuits.

10. An automatic frequency control system as defined in claim 9 wherein said first circuit is connected to said VHF tuner and said second circuit is connected to said UHF tuner.

11. An automatic frequency control system as defined in claim 9 wherein said error amplifier is a transistor having a collector electrode connected to said switching means, said transistor being cut-off for frequency errors of said first sense and saturated for frequency errors of said second sense.

12. An automatic frequency control system as defined in claim 9 further including signal detector circuitry connected to said video channel and to said error amplifier for detecting a video signal in said video channel and modifying the voltage provided to said UHF and VHF tuners in the absence of a detected video signal.

13. An automatic frequency control system as defined in claim 12 wherein said signal detector circuitry includes a transistor having an output electrode connected by a resistor to the output of said error amplifier, said transistor being switched to a conducting state in the absence of a detected video signal to decrease the voltage provided to said UHF and VHF tuners.

* * * * *